June 30, 1970 B. P. HALL 3,518,593

MAGNETIC HANDLING DEVICE

Filed Feb. 26, 1968

INVENTOR
BRADLEY P. HALL

BY Nathan N. Kallman

United States Patent Office 3,518,593
Patented June 30, 1970

3,518,593

MAGNETIC HANDLING DEVICE

Bradley P. Hall, San Jose, Calif., assignor to International Business Machines Corporation, Armonk, N.Y., a corporation of New York Filed Feb. 26, 1968, Ser. No. 708,336
Int. Cl. H01f 7/20
U.S. Cl. 335—285 9 Claims

ABSTRACT OF THE DISCLOSURE

A magnetic handling device incorporates a magnetic sheet that is formed with uniformly spaced magnetic zones or strips, the sheet being polarized in one direction, so that magnetic parts may be automatically aligned in a substantially uniform array on the sheet.

BACKGROUND OF THE INVENTION

Field of the invention

This invention relates to a magnetic device adapted for handling small and fragile magnetic parts.

Description of the prior art

Present day technology is directed to miniaturization of parts and assemblies, for the purposes of saving space and improving the performance and operating parameters of the assemblies, among other things. By way of example, some magnetic heads that are utilized for high density recording and playback are now formed from relatively small and thin magnetic cores or laminations, on the order of factions of an inch. The magnetic parts are generally fragile and so small that handling and assembly are tedious, and significant breakage and loss are experienced. Thus, the labor and material costs tend to be unduly high. In addition, when processing small magnetic type parts, undesirable phenomena such as rotation and flipping occur making it difficult to follow a uniform or standard manufacturing procedure. Also, when magnetic parts are shipped in plastic type containers, difficulties have been encountered by the presence of static electricity, which affects the position and orientation of the parts, in that these parts become suspended and dangle by their ends from a surface of the plastic package. Various other problems, such as contamination, are known to occur when working with such minute, thin and fragile pieces.

SUMMARY OF THE INVENTION

An object of this invention is to provide a magnetic handling device that enhances the processing and assembly of small or minute elements.

Another object of this invention is to provide a magnetic handling device or fixture that enables alignment of a multiplicity of parts.

Another object is to provide a reusable shipping container that minimizes loss and breakage of small pieces during transfer, shipping, and inspection, and that affords a substantially acurate count of such pieces.

According to the invention, a magnetic device comprises a magnetic sheet or layer that has been polarized unidirectionally, and has magnetic zones formed in strips or rows along the sheet. The magnetic field intensity at the zones is above a predetermined threshold, at which magnetically attracted elements to be processed are attracted to the magnetic sheet; conversely, the areas between the zones are not sufficiently magnetic to attract the elements. In this manner, a multiplicity of parts may be aligned in spaced relation in a uniform array of rows or columns, making it easy to transport, count, handle, and assemble such parts.

BRIEF DESCRIPTION OF THE DRAWING

The foregoing and other objects, features and advantages of the invention will be apparent from the following more particular description of a preferred embodiment of the invention, in which.

Similar numerals refer to similar elements throughout the drawings.

DESCRIPTION OF THE PREFERRED EMBODIMENT

Figure 1:
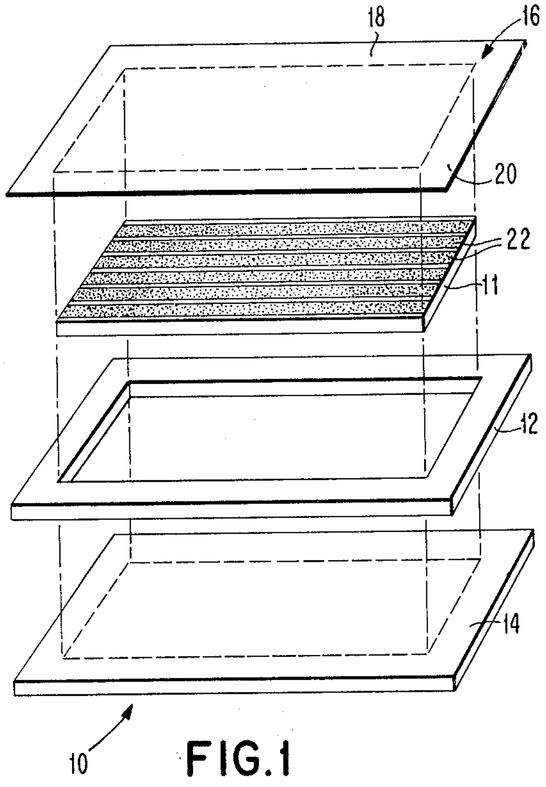
FIG. 1 is an exploded view of a magnetic handling device, in accordance with this invention.
Figure 3:
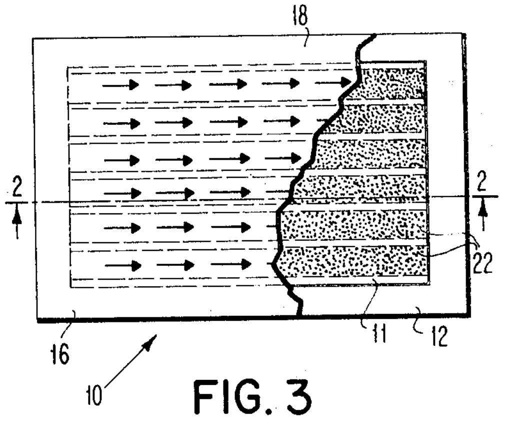
FIG. 3 is a top view of the magnetic device, with a portion of the top layer removed, for purpose of description.
Figure 2:
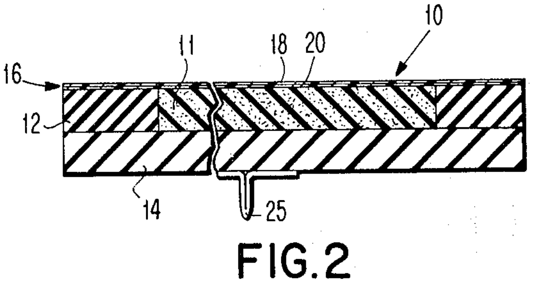
FIG. 2 is a side sectional view, partly broken away, of the inventive device depicted in FIG. 1.

With reference to FIGS. 1, 2 and 3, a magnetic handling device 10 comprises a magnetic layer 11 that is secured within a nonmagnetic frame 12, which is sandwiched between a nonmagnetic base 14 and a relatively thin nonmagnetic assembly 16. The assembly 16 includes a Mylar film 18 and paper sheet 20. The magnetic layer 11 is preferably made from a magnetic rubber stripping such as "Magnaribbon" a product of Magna Visual Company, of St. Louis, Mo. The rubber stripping 11 has magnetic material, such as a ferric oxide, embedded therein, but in a predetermined pattern or configuration, and to a finite depth. Alternatively, the magnetic material may be brushed, sprayed or silkscreened onto one surface of the layer 11.

In accordance with this invention, the magnetic material is disposed within the layer 11 in a linear array or spaced rows 22, so that the magnetic field intensity has a varying characteristic in a direction perpendicular to the longitudinal direction of each row 22. The polarization of the magnetic field associated with each row 22 is in the same direction, preferably parallel to a side of the strip or layer 11. The magnetic strip 11 is joined to the frame 12 by an adhesive.

To ensure that the magnetic field does not act to attract magnetic workpieces that are located at a distance beyond the area where the pieces are being collected, the relative dimensions of the several layers and the intensity of the magnetic field are predetermined with relation to the size and weight of the workpieces. Furthermore, the magnetic material is deposited on or close to one surface of the strip 11 so that the greater magnetic field intensity appears adjacent to such working surface, and a field gradient is established across the depth of the strip 11. For example, with a magnetic strip 11 of 1/16 inch thickness, a field of 150–200 gauss is developed at the working surface of the strip, while the opposite surface which is positioned onto the base 14 provides a much smaller field of only 12–18 gauss. This field configuration has been successfully employed for processing ferrite cores used for magnetic heads, such cores being approximately 5/32 inch in length, 1/16 inch in width, and .010–.015 inch thick, and about .007–.008 gram in weight, by way of example.

In this successful embodiment, the magnetic layer 11 is 1/16 inch thick, and the retaining frame 12 and nonmagnetic frame 14 are of the same thickness. The Mylar layer 18, which provides a relatively smooth, tough work surface for the work elements to be handled, and the paper facing 20 that serves as a support for the Mylar, are about .012 inch thickness combined.

FIG. 3 illustrates an example of the polarization of the magnetic field, as it appears along the magnetic ribbon 11, and across the top of the assembly or at the surface of the Mylar sheet 18. It should be understood that the direction of polarization may be varied to suit the particular process or manufacturing technique involved.

Figure 4:
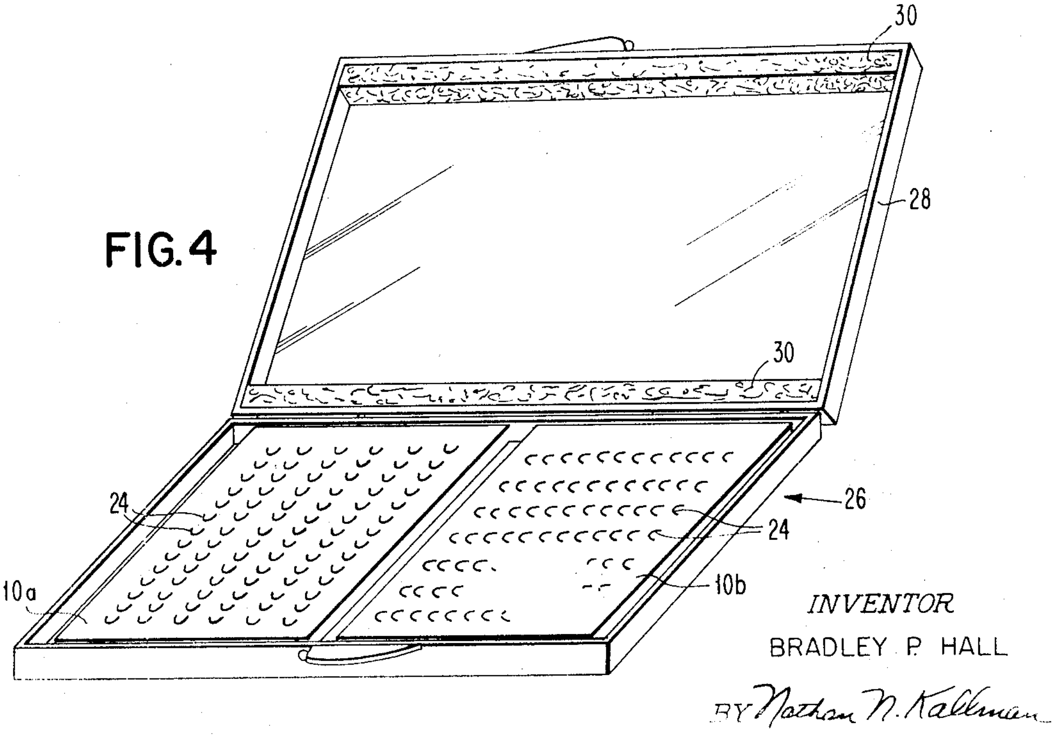
FIG. 4 is a perspective view of a container adapted to hold two of the magnetic devices for shipment.

In practice, the Mylar surface 18 of the magnetic handling device 10 is moved past and closely adjacent to a quantity of magnetic workpieces 24 that have been processed in bulk. A lifting tab 25, attached centrally to the underside of the base 14, may be used for a finger grasp. This underside or exposed surface has a protective paint coating to reduce the effects of wear. The workpieces 24, such as depicted in FIG. 4, are magnetically attracted to the magnetic rubber strip 11 and impinge on the Mylar surface 18 within the framed area of the magnetic zones, where they remain. The nonmagnetic frame area 12 ensures that no workpieces 24 will gather at the periphery of the depice 10, but will be confined within the magnetic area delineated by the magnetic sheet 11. Since the flux lines are arranged so that defined and discrete magnetic strip zones 22 are formed, the workpieces align themselves along these zones in the direction of polarization. Preferably, the distances between the peak flux intensity lines of adjacent zones are made to be greater than the longest dimension of the workpieces 24.

In FIG. 4, two separate magnetic handling devices **10*a* and 10*b* are represented, with different directions of polarization. The two devices 10*a* and 10*b* are set within a clear plastic container 26, of polyethylene for example, having a cover 28. The cover 28 includes rubber stripping 30 that rests against the outer frame area of the devices 10, to hold the devices 10 immobile during shipment and transport, and thus reduce loss and breakage. Any vibration and jiggling experienced during shipment of the container 26 and devices 10 will not jar the workpieces 24 loose from the devices 10, but only will help to improve the alignment of the workpieces 24**.

By means of this invention, the work elements 24 are adequately spaced and uniformly aligned to allow a fairly accurate count. In addition, each workpiece 24 can be individually removed, by tweezers or other instrument, without interfering with the other spaced elements. When working with a tool, such as a metallic tweezer, the smooth yet tough Mylar surface 18 on the working surface affords long life of the devices 10. By virtue of this simple and inexpensive handling device, breakage and loss of small, fragile, and brittle parts are substantially reduced, and a large savings in processing, cleaning, and assembly time is realized. The device makes it possible to air sweep contaminants without disturbing the minute parts.

While the invention has been particularly shown and described with reference to a preferred embodiment thereof, it will be understood by those skilled in the art that the foregoing and other changes in form and details may be made therein without departing from the spirit and scope of the invention. For example, the nonmagnetic base 14 may be made thicker, and with a recess to accommodate the magnetic strip 11, thereby eliminating the need for a separate frame 12.

What is claimed is:

1. A device for handling magnetic workpieces comprising:

a first sheet having a plurality of discrete magnetic zones forming a two-dimensional matrix on the top surface of said first sheet, each said magnetic zone having the same polarization and having a greater magnetic field intensity at said top surface than at the bottom surface of said first sheet, the distance between the peak flux intensity lines of any two adjacent said magnetic zones being greater than the longest dimension of the magnetic workpieces to be handled;

a nonmagnetic frame for holding said first sheet and for preventing the magnetic workpieces to be handled from gathering at the periphery of said device;

a nonmagnetic base attached to said bottom surface of said first sheet and to the bottom of said nonmagnetic frame for supporting said first sheet;

a nonmagnetic work layer joined to said top surface of said first sheet and to the top of said nonmagnetic frame for providing a smooth and durable working surface for said device; and the thickness of said nonmagnetic work layer and the intensity of said magnetic zones in said first sheet coating to generate a magnetic field at the surface of said nonmagnetic working layer of such a magnitude with relation to the size and weight of the magnetic workpiece to be handled that only magnetic workpieces within a desired distance from said device will be attracted to said device.

2. A magnetic handling device as in claim 1, wherein the magnetic field intensity at said top surface is more than ten times the field intensity at said bottom surface.

3. A magnetic handling device as in claim 1, wherein the magnetic field intensity at said top surface is between 150 to 220 gauss, and at said bottom surface is between 12 to 18 gauss.

4. A magnetic handling device as in claim 1, wherein said work layer comprises a Mylar sheet on a paper backing, disposed coextensively against said top surface.

5. A magnetic handling device as in claim 1, wherein said work layer has a thickness that is a fraction of the thickness of said first sheet.

6. A magnetic handling device as in claim 1, wherein said work layer has a thickness about one-fifth that of said first sheet.

7. A magnetic handling device as in claim 1, wherein said base has a thickness substantially the same as that of said first sheet.

8. A magnetic handling device as in claim 1, including a lifting tab attached to said nonmagnetic base.

9. A magnetic handling device as in claim 1, including container means for enclosing such device for transport.

References Cited

UNITED STATES PATENTS

| | | | |
|---|---|---|---|
| 2,958,019 | 10/1960 | Scholten et al. | 335—285 |
| 3,191,106 | 6/1965 | Baermann | 335—303 XR |
| 3,195,022 | 7/1965 | Staver. | |
| 3,228,133 | 1/1966 | Baermann. | |

FOREIGN PATENTS

| | | |
|---|---|---|
| 1,268,889 | 6/1961 | France. |

GEORGE HARRIS, Primary Examiner

U.S. Cl. X.R.

335—303